US007848548B1

(12) United States Patent  (10) Patent No.: US 7,848,548 B1
Moon et al. (45) Date of Patent: Dec. 7, 2010

(54) METHOD AND SYSTEM FOR ROBUST DEMOGRAPHIC CLASSIFICATION USING POSE INDEPENDENT MODEL FROM SEQUENCE OF FACE IMAGES

(75) Inventors: Hankyu Moon, State College, PA (US); Satish Mummareddy, State College, PA (US); Rajeev Sharma, State College, PA (US)

(73) Assignee: VideoMining Corporation, State College, PA (US)

( * ) Notice: Subject to any disclaimer, the term of this patent is extended or adjusted under 35 U.S.C. 154(b) by 848 days.

(21) Appl. No.: 11/811,614

(22) Filed: Jun. 11, 2007

(51) Int. Cl.
G06K 9/00 (2006.01)
(52) U.S. Cl. .................. 382/118; 382/100; 382/115; 382/190; 382/325
(58) Field of Classification Search .............. 382/100, 382/115, 118, 181, 190, 325
See application file for complete search history.

(56) References Cited

U.S. PATENT DOCUMENTS

| | | | |
|---|---|---|---|
| 5,781,650 A | 7/1998 | Lobo et al. | |
| 6,526,156 B1 | 2/2003 | Black et al. | |
| 6,707,933 B1 | 3/2004 | Mariani et al. | |
| 6,741,756 B1 | 5/2004 | Toyama et al. | |
| 6,973,201 B1 | 12/2005 | Colmenarez et al. | |
| 6,990,217 B1 * | 1/2006 | Moghaddam et al. | 382/118 |
| 7,043,056 B2 | 5/2006 | Edwards et al. | |
| 7,046,826 B2 | 5/2006 | Toyama et al. | |
| 7,103,211 B1 * | 9/2006 | Medioni et al. | 382/154 |
| 7,221,809 B2 * | 5/2007 | Geng | 382/280 |
| 7,711,155 B1 * | 5/2010 | Sharma et al. | 382/118 |
| 2002/0102024 A1 | 8/2002 | Jones et al. | |
| 2002/0159627 A1 | 10/2002 | Schneiderman et al. | |
| 2003/0108223 A1 * | 6/2003 | Prokoski | 382/115 |
| 2003/0161500 A1 | 8/2003 | Blake et al. | |
| 2004/0240708 A1 | 12/2004 | Hu et al. | |
| 2005/0180626 A1 | 8/2005 | Moon et al. | |
| 2005/0265581 A1 | 12/2005 | Porter et al. | |

OTHER PUBLICATIONS

S. Li, J. Yan, X. Hou, Z. Li and H. Zhang, "Learning Low Dimensional Invariant Signature of {3-D} Object under Varying View and Illumination from {2-D} Appearances," International Conference in Computer Vision, 2001.
L. Walawalkar, M. Yeasin, A. M. Narasimhamurthy, and R. Sharma, "Support Vector Learning for Gender Classification Using Audio and Visual Cues," International Journal of Pattern Recognition and Artificial Intelligence, vol. 17(3), 2003.

* cited by examiner

Primary Examiner—Bhavesh M Mehta
Assistant Examiner—Stephen R Koziol

(57) ABSTRACT

The invention provides a face-based automatic demographics classification system that is robust to pose changes of the target faces and to accidental scene variables, by using a pose-independent facial image representation which comprises multiple pose-dependent facial appearance models. Given a sequence of people's faces in a scene, the two-dimensional variations are estimated and corrected using a novel machine learning based method. We estimate the three-dimensional pose of the people, using a machine learning based approach. The face tracking module keeps the identity of the person using geometric and appearance cues, where multiple appearance models are built based on the poses of the faces. Each separately built pose-dependent facial appearance model is fed to the demographics classifier, which is trained using only the faces having the corresponding pose. The classification scores from the set of pose-dependent classifiers are aggregated to determine the final face category, such as gender, age, and ethnicity.

38 Claims, 9 Drawing Sheets

|       | -60° | -30° | 0° | 30° | 60° |
|-------|------|------|-----|-----|-----|
| -30°  |      |      |    |     |     |
| -15°  |      |      |    |     |     |
| 0°    |      |      |    |     |     |
| 15°   |      |      |    |     |     |
| 30°   |      |      |    |     |     |

METHOD AND SYSTEM FOR ROBUST DEMOGRAPHIC CLASSIFICATION USING POSE INDEPENDENT MODEL FROM SEQUENCE OF FACE IMAGES

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of the Invention

The present invention is a method and system to provide a face-based automatic demographics classification system that is robust to pose changes of the target faces and to accidental scene variables, such as noise, lighting, and occlusion. Given a video stream of people's faces detected from a face detector, the two-dimensional (2D) and three-dimensional (3D) poses are estimated to facilitate the tracking and the building of pose-dependent facial models. Once the track is complete, the separately built pose-dependent facial models are fed to the demographics classifiers that are again trained using only the faces having the corresponding pose, to determine the final face category such as gender, age, and ethnicity of the person.

2. Background of the Invention

Face Detection

There have been prior attempts for detecting human faces in still images or in videos.

U.S. Pat. Appl. Pub. No. 20020102024 of Jones et al. (hereinafter Jones) disclosed an object detection system for detecting instances of an object in a digital image using an image integrator and an object detector, which includes a classifier (classification function) and an image scanner. The image integrator receives an input image and calculates an integral image representation of the input image. The image scanner scans the image in same sized subwindows. The object detector uses a cascade of homogeneous classification functions or classifiers to classify the subwindows as to whether each subwindow is likely to contain an instance of the object. Each classifier evaluates one or more features of the object to determine the presence of such features in a subwindow that would indicate the likelihood of an instance of the object in the subwindow.

U.S. Pat. Appl. Pub. No. 20020159627 of Schneiderman et al. (hereinafter Schneiderman) disclosed an object finder program for detecting the presence of a three-dimensional object in a two-dimensional image containing a two-dimensional representation of the three-dimensional object. The object finder uses the wavelet transform of the input two-dimensional image for object detection. A pre-selected number of view-based detectors are trained on sample images prior to performing the detection on an unknown image. These detectors then operate on the given input image and compute a quantized wavelet transform for the entire input image. The object detection then proceeds with sampling of the quantized wavelet coefficients at different image window locations on the input image and efficient look-up of pre-computed log-likelihood tables to determine object presence. The object finder's coarse-to-fine object detection strategy coupled with exhaustive object search across different positions and scales results in an efficient and accurate object detection scheme.

The disclosed method assumes that a stream of detected faces are fed to the system, where face detection is performed by utilizing a machine learning based face detection method, similar to the method disclosed in Jones and Schneiderman.

Face Tracking

There have been prior attempts for tracking a human face in video, using appearance-based cue.

U.S. Pat. No. 6,526,156 of Black, et al. (hereinafter Black) disclosed a system that tracks and identifies view-based representations of an object through a sequence of images. As the view of the object changes due to its motion or the motion of its recording device, the object is identified by matching an image region containing the object with a set of basis images represented by an eigenspace. This identification and tracking system operates when views of the object in the image are deformed under some transformation with respect to the eigenspace. Matching between the image region and the eigenspace is performed via a robust regression formulation that uses a coarse to fine strategy with incremental refinement. The transformation that warps the image region of a current image frame into alignment with the eigenspace is then used to track the object in a subsequent image frame.

U.S. Pat. Appl. Pub. No. 20030161500 of Blake * et al. (hereinafter Blake) disclosed a new system and method for probabilistic exemplar-based tracking of patterns or objects. Tracking is accomplished by first extracting a set of exemplars from training data. A dimensionality for each exemplar cluster is then estimated and used for generating a probabilistic likelihood function for each exemplar cluster. Any number of conventional tracking algorithms are then used in combination with the exemplars and the probabilistic likelihood functions for tracking patterns or objects in a sequence of images, or in spaial or frequency domains.

U.S. Pat. No. 6,973,201 of Colmenarez, et al. (hereinafter Colmenarez) disclosed an image processing system that processes a sequence of images to generate a statistical model for each of a number of different persons to be tagged so as to be identifiable in subsequent images. The statistical model for a given tagged person incorporates at least one appearance feature, such as color, texture, etc., and at least one geometric feature, such as shape or position of a designated region of similar appearance within one or more images. The models are applied to subsequent images in order to perform a person detection, person location and/or person tracking operation. An action of the image processing system is controlled based on a result of the operation.

U.S. Pat. Appl. Pub. No. 20050265581 of Porter et al. (hereinafter Porter) disclosed a video data processing apparatus, the video data comprising a sequence of images composed of: an object tracker operable to detect the presence of one or more objects within an image and to track a detected object across successive images; an identity associator operable to associate an identity with an object tracked by the object tracker; a counter operable, for a first and second identity, to count the number of images within which a tracked object associated with the first identity and a tracked object associated with the second identity have both been detected; a similarity detector operable to determine whether two tracked objects are similar in appearance; and the identity associator being operable to change the identity associated with a first tracked object to the identity associated with a second tracked object if: (a) the similarity detector determines that the first and second tracked objects are similar in appearance and (b) the count corresponding to the identities associated with the first and second tracked objects, as counted by the counter, is less than a predetermined threshold.

The disclosed invention utilizes the facial appearance model to keep the identity of people, as in Black, and Blake. However, the method does not require offline training or model building; because the proposed application builds pose-dependent online models. Provided with the pose of the face, the appearance model does not need to take the pose (two-dimensional or three-dimensional) variations into account. It doe not involve the transformation of the model as the two-dimensional geometric variations are adjusted using the facial pose correction step, and the three-dimensional variation is handled by employing multiple models. The inventions of Colmenarez and Porter are designed to track multiple faces and keep the person identity at the same time. The proposed invention, however, does not perform explicit tracking, which require continuity of the tracks; it just makes correspondences between detected faces. Most of these tracking approaches will fail under low frame rates or severe occlusion, however, the proposed method is still able to track faces under these circumstances.

Facial Pose Estimation

There have been prior attempts for determining the direction where the human head is facing.

U.S. Pat. No. 6,707,933 of Mariani, et al. (hereinafter Mariani) disclosed a method, apparatus, and computer program product for estimating face direction using a single gray-level image of a face are described. Given the single image, a face direction can be determined by computing a nose axis maximizing a correlation measure between the left and right sides of the face. The correlation measure is computed by comparing one of the two sides with another synthetic side derived from the other side using symmetry and perspective transforms. The computation result is a word describing the spatial position of the face and combining height ("up", "normal", "down") and neck-rotation ("left", "frontal", "right").

U.S. Pat. No. 6,741,756 of Toyama, et al. (hereinafter Toyama) disclosed a system and method for automatically estimating the orientation or pose of an object, such as a human head, from any viewpoint and includes training and pose estimation modules. The training module uses known head poses for generating observations of the different types of head poses and the pose estimation module receives actual head poses of a subject and uses the training observations to estimate the actual head pose. Namely, the training module receives training data and extracts unique features of the data, projects the features onto corresponding points of a model and determines probability density function estimation for each model point to produce a trained model. The pose estimation module receives the trained model and an input object and extracts unique input features of the input object, projects the input features onto points of the trained model and determines an orientation of the input object that most likely generates the features extracted from input object.

U.S. Pat. No. 7,043,056 of Edwards, et al. (hereinafter Edwards) disclosed a method of determining an eye gaze direction of an observer. The method comprises the steps of: (a) capturing at least one image of the observer and determining a head pose angle of the observer; (b) utilizing the head pose angle to locate an expected eye position of the observer, and (c) analyzing the expected eye position to locate at least one eye of the observer and observing the location of the eye to determine the gaze direction.

U.S. Pat. No. 7,046,826 of Toyama, et al. (hereinafter Toyama 7046826) disclosed a system and method for estimating and tracking an orientation of a user's face by combining head tracking and face detection techniques. The orientation of the face, or facial pose, can be expressed in terms of pitch, roll and yaw of the user's head. Facial pose information can be used, for example, to ascertain in which direction the user is looking. In general, the facial pose estimation method obtains a position of the head and a position of the face and compares the two to obtain the facial pose. In particular, a camera is used to obtain an image containing a user's head. Any movement of the user's head is tracked and the head position is determined. A face then is detected on the head and the face position is determined. The head and face positions are then compared.

U.S. Pat. Appl. Pub. No. 20040240708 of Hu et al. (hereinafter Hu) disclosed a method to effectively assess a user's face and head pose such that a computer or like device can track the user's attention towards a display device(s). Then the region of the display or graphical user interface toward which the user is turned can be automatically selected without requiring the user to provide further inputs. A frontal face detector is applied to detect the user's frontal face and then component detectors detect key facial points such as left/right eye center, left/right mouth corner, nose tip, etc. The system then tracks the user's head by an image tracker and determines yaw, tilt and roll angle and other pose information of the user's head through a coarse to fine process according to key facial points and/or confidence outputs by the pose estimator.

U.S. Pat. Appl. Pub. No. 20050180626 of Moon et al. (hereinafter Moon) disclosed a method for accurately estimating a pose of the human head in natural scenes utilizing positions of the prominent facial features relative to the position of the head. A high-dimensional, randomly sparse representation of a human face, using a simplified facial feature model transforms a raw face image into sets of vectors representing the fits of the face to a random, sparse set of model configurations. The transformation collects salient features of the face image which are useful to estimate the pose, while suppressing irrelevant variations of face appearance. The relation between the sparse representation of the pose is learned using Support Vector Regression (SVR). The sparse representation, combined with the SVR learning is then used to estimate a pose of facial images.

"Learning Low Dimensional Invariant Signature of {3-D} Object under Varying View and Illumination from {2-D} Appearances," International Conference in Computer Vision, 2001, of S. Li, J. Yan, X. Hou, Z. Li, and H. Zhang (hereinafter Li) proposes an invariant signature representation for appearances of 3-D objects under varying view and illumination, and a method for learning the signature from multi-view appearance examples. Li claims that the signature, a nonlinear feature, provides a good basis for three-dimensional object detection and pose estimation due to its following properties: (1) its location in the signature feature space is a simple function of the view and is insensitive or invariant to illumination; (2) it changes continuously as the view changes, so that the object appearances at all possible views should constitute a known simple curve segment in the feature space; (3) and the coordinates of object appearances in the feature space are correlated in a known way according to a predefined function of the view. The first two properties are provided as a basis for object detection and the third for view pose estimation. To compute the signature representation from input, the article present a nonlinear regression method for learning a nonlinear mapping from the image space to the feature space.

The prior invention of Mariani solves the problem of facial pose estimation by comparing the relative positions of the facial features, most notably the nose. The estimates put the yaw and pitch of the face in discrete pose bins: ("left", "rontal", "right") and ("up", "normal", "down"), where the resolution is not enough to determine whether the person is actually facing the display.

The invention of Toyama builds an explicit parametric (Gaussian) statistical model of the facial feature appearance using training data. The success of the method depends on rough alignment of facial features to the models; misalignment can potentially cause a large degree of error. The present method compares the input patterns against a number of model patterns to compute the likelihood of the given pattern to be from the model. Each likelihood computation is robust due to the use of learning machines, where large number of faces having a wide range of scene variations, such as noise, lighting, and occlusions, are used to train the machine.

There are prior inventions, such as Edwards, on estimating eye gaze to measure the person's degree of attention; measuring eye gaze usually requires a close range, high resolution image. The proposed method is designed to perform well using far-range low-resolution images.

The invention by Toyama (U.S. Pat. No. 7,046,826) estimates the face orientation by comparing the head position and facial position; the method is also susceptible to errors due to the errors in head or face localization, and is only able to compute relative estimates. The present method is able to produce absolute (yw, pt) angle, because the system is designed and trained to output absolute (yw, pt) angles.

The head pose estimation method by Hu uses component detectors to first locate facial features, and compute the facial pose, which poses a risk of large error when the component detectors fail. The proposed method learns the holistic pattern to estimate the pose; it does not involve such risk.

The method by Moon is similar to the proposed method in terms of learning the global patterns on a large number of facial images using a machine learning technique. However, learning the whole space of patterns using a single machine is regarded as inefficient due to the wide range of pose variation. The present method overcomes this weakness by using a plurality of learning machines, each of which is specialized to a given pose range. The use of a set of facial feature-based high-frequency filters is again similar. However, in Moon, the range of facial model pose for generating the filter is the whole range of the possible facial pose; in the proposed method the range of the model pose corresponds to the individual inherent pose of the specific machine, thereby providing a more specialized estimation.

The method by Li is similar to the proposed method in terms of using multiple learning machines (in Li, SVR) to represent and estimate the varying pose of faces (or general objects). However, the proposed method represents and estimates both the two-dimensional pose variations and the three-dimensional variations in a way that each machine is trained to estimate the likelihood of the given face having certain pose, based on the neural tuning principle. In Li, the machines are only used for yaw estimation, and each machine is trained to output a nonlinear function of the yaw angle difference between the input face and the machine's inherent pose. The proposed use of either feature window filters or feature model-based high-frequency filters makes the estimation problem robust to illumination changes in an explicit way.

Face-Based Demographics Classification

There have been prior attempts for recognizing the demographic category of a person by processing the facial image using a machine learning approach.

U.S. Pat. No. 5,781,650 of Lobo, et al. (hereinafter Lobo) disclosed a method for automatically finding facial images of a human face in a digital image, and classifying the age of the person into an age category. Step 1 of the process is to find facial features of the digital image encompassing the chin, sides of the face, and the virtual top of the head, eyes, mouth and nose of the image. Step 2 is to compute the facial feature ratios of the facial features found in Step 1. Step 3 is to compute a wrinkle analysis of the image. Step 4 is to combine the previous two steps to categorize the age of the facial image. The invention can locate and detect facial images for age classification from digital camera images and computerized generated images.

U.S. Pat. No. 6,990,217 of Moghaddam, et al. (hereinafter Moghaddam) disclosed a method to employ Support Vector Machines (SVMs) to classify images of faces according to gender, by training the images, including images of male and female faces; determining a plurality of support vectors from the training images for identifying a hyperplane for the gender decision; and reducing the resolution of the training images and the test image by sub-sampling before supplying the images to the Support Vector Machine.

"Support Vector Learning for Gender Classification Using Audio and Visual Cues," International Journal of Pattern Recognition and Artificial Intellegence, Vol. 17(3), 2003, of L. Walawalkar, M. Yeasin, A. M. Narasimhamurthy, and R. Sharma (hereinafter Walawalkar) disclosed a computer software system for multi-modal human gender classification, comprising: a first-mode classifier classifying first-mode data pertaining to male and female subjects according to gender and rendering a first-mode gender-decision for each male and female subject; a second-mode classifier classifying second-mode data pertaining to male and female subjects according to gender and rendering a second-mode gender-decision for each male and female subject; and a fusion classifier integrating the individual gender decisions obtained from said first-mode classifier and said second-mode classifier and outputting a joint gender decision for each of said male and female subjects.

The prior arts (Lobo, Moghaddam, and Walawalkar), mentioned above, for demographics classification aim to classify a certain class of demographics profile (either age or gender) based on the image signature of faces. The approaches by Moghaddam and Walawalkar deal with a much smaller scope of problems than claimed method tries to solve; they both assume that the facial regions are identified and only address the problem of individual face classification. They do not address the problem of detecting and tracking the faces for determining the demographic identity of a person over the course of his/her facial exposure to the imaging device. Lobo claims a more comprehensive solution to the problem of face detection, feature detection, and age classification. However, this approach depends heavily on the model-based face detection and facial feature detection under close range high-resolution frontal face images. The proposed invention assumes a much less constrained scenario, and can deal with varied pose (by using pose-dependent model) and low-resolution facial image (by using holistic feature of the face).

The proposed invention is a comprehensive solution where the automated system estimates and corrects the two-dimensional pose variations, estimates the three-dimensional pose, and tracks the people's faces individually. The use of a pose-dependent facial appearance model has twofold improvements. First, it improves the demographics classification accuracy because the accumulated appearance model better represents the appearance of the person's face in that it smoothes out the noise and averages out potential accidental scene variables such as lighting changes, andocclusions. Second, instead of performing classification, which is typically computationally expensive, the proposed method performs classification only once per a person track, at the completion of the track, which makes the whole system very efficient.

In summary, the present invention provides a comprehensive solution of processing the stream of facial images for the purpose of classifying them into demographics categories. It estimates and corrects facial pose, tracks multiple faces, builds pose-dependent appearance models, and performs classification on the appearance models. All of these steps work toward providing an accurate tracking and an accurate and efficient demographics classification.

SUMMARY

The present invention is a method and system for a face-based automatic demographics classification system that is robust to pose changes of the target faces and to accidental scene variables, such as noise, lighting, and occlusion.

Face Detection

It is one of the objectives of the first step of the processing to detect faces in plurality of images captured from a means for capturing images. A machine learning based face detection method is used to detect human faces in images, regardless of imaging conditions such as lighting variations, pose variations, and noise from the means for capturing images. The output faces from typical face detection methods are varied in terms of the two-dimensional pose: position, size, and in-plane orientation.

Two-Dimensional Facial Pose Correction

It is one of the objectives of the second step of the processing to normalize the two-dimensional pose of the face detected from face detection. The two-dimensional pose of the face is corrected so that the facial features across the faces are aligned. The normalization of the facial image also benefits the subsequent three-dimensional facial pose estimation and appearance model building; the problem of three-dimensional pose estimation and appearance model building becomes more manageable when the locations of the facial features are aligned.

The estimation of facial pose (positionX, positionY, scale, orientation) is carried out by employing a parallel array of multiple learning machine regressors, where each machine has an inherent pose parameter, and is trained to output the likelihood of the input face having the inherent pose. This architecture of employing specialized learning machines contributes to highly improved accuracy, because it is well known in the machine learning community that the learning machines do a more efficient estimation when they are given more limited (specialized) tasks.

To extract relevant features for estimating the facial pose, the training and testing can be carried out on the filtered representation, instead of the whole facial image pixel values. It is the projection of the whole facial image by a set of windows, whose sizes and locations match the locations and the sizes of the corresponding facial features. Each learning machine tuned to a specific pose has a corresponding set of three windows, two for picking up both eye regions and one for the mouth region, whose positions and sizes are based on the feature positions and sizes of the corresponding face model.

To extract relevant features for estimating the facial pose, the training and testing can be carried out on the filtered representation, as an alternative to the method described above. It is the transformation by a set of filters constructed to collect edge responses of the boundary gradient signature of the facial features. The range of the model pose for generating the filter corresponds to the individual inherent two-dimensional pose of the specific machine, thereby providing a more specialized estimation. The step serves to extract high-spatial frequency structure of the facial features, while suppressing the irrelevant low-spatial frequency structure generated from different lighting.

Three-Dimensional Facial Pose Estimation

It is one of the objectives of the third step of the processing to determine the three-dimensional pose (out-of-plane rotation) of the face detected from the face detection, and corrected for two-dimensional facial pose.

The estimation of the three-dimensional facial pose (yw, pt) is carried out by employing a parallel array of multiple learning machine regressors. Each machine network has an inherent pose parameter. Given an input face, the network is trained to estimate the likelihood of the face having the inherent pose. This architecture of employing specialized learning machines contributes to highly improved accuracy. The facial images used for training are typically normalized for two-dimensional facial pose variation, so that the system estimates three-dimensional pose more efficiently. After each network is trained, the pose of the input test face is estimated by the sum of the inherent parameters of all the learning machines, each weighted by the estimated likelihood of the given pose.

To extract relevant features for estimating the facial pose, the training and testing can be carried out on the filtered representation, instead of raw image pixel values. It is the transformation by a set of filters constructed to collect edge responses of the gradient signature of facial features. The range of the model pose for generating the filter corresponds to the individual inherent three-dimensional pose of the specific machine, thereby providing a more specialized estimation. The step serves to extract high-spatial frequency structure of the facial features, while suppressing the irrelevant low-spatial frequency structure mostly generated from lighting variation.

Face Tracking and Appearance Model Building

It is one of the objectives of the fourth step of the processing to keep the identity of the person and to construct the synthetic appearance model for subsequent demographics classification.

The face tracking is carried out on the face images that are detected by the face detector and are subsequently normalized by the two-dimensional facial pose correction. The three-dimensional pose is also used to send the faces to separate pose-dependent appearance models. The tracking step consists of the track management module and the appearance model building module.

It is one of the objectives of the track management step of the processing to generate a track when a new person appears in the scene, to assign detected faces to existing tracks to keep identities of people in the scene, and to terminate a track when a person is out of the scene. The assignment of the detected faces to existing tracks or new tracks, is based on the geometric match (position, size, and time) and the appearance match scores (pixel values) between the faces and the tracks.

It is one of the objectives of the appearance model building step of the processing to construct possibly multiple appearance models of the faces that belong to a given track. The three-dimensional pose of the face assigns the given face to one of the pre-determined three-dimensional pose bins. Faces in each pose bin construct a separate appearance model by incrementally adding the input faces. Building multiple appearance models according the three-dimensional pose makes it possible to build more accurate appearance models, thereby achieving more robust tracking and accurate demographics classification.

Demographics Classification on Multiple Appearance Models

It is one of the objectives of the fifth step of the processing to accurately and robustly classify the faces processed from the previous steps. The demographics classification is carried out on the face appearance model image(s) constructed by the tracking module. The sum of demographics scores from all the pose-dependent classification, weighted by the confidence levels of that particular appearance models, determines the final demographics label of the face. This scheme achieves four important improvements. First, by executing demographics classification (which typically consumes significant computing resources) only once per track, the whole system resource is utilized more efficiently, thereby improving the speed of execution. Second, by constructing three-dimensional pose-dependent facial appearance models and matching against the input face having the same pose range, the tracking accuracy improves. The tracking accuracy translates into classification accuracy, because if the track has faces belonging to more than one person, the classification accuracy degrades. Third, the demographics classification accuracy improves because the appearance models built are less prone to accidental image variables such as noise, lighting variations, occlusions, etc. Fourth, by performing three-dimensional pose-dependent classification, the demographics classification achieves better accuracy.

The series of facial image processing, comprising face detection, two-dimensional facial pose correction, three-dimensional facial pose estimation, face tracking and appearance model building, and pose-dependent demographics classification, is carried out to achieve an efficient and accurate estimation of the demographic information of the faces in the sequence of images.

DRAWINGS

Figures

FIG. 7 shows an exemplary sampling of (yw, pt) ranges for three-dimensional pose estimation in an exemplary embodiment of the present invention.

DETAILED DESCRIPTION OF THE INVENTION

Figure 1:
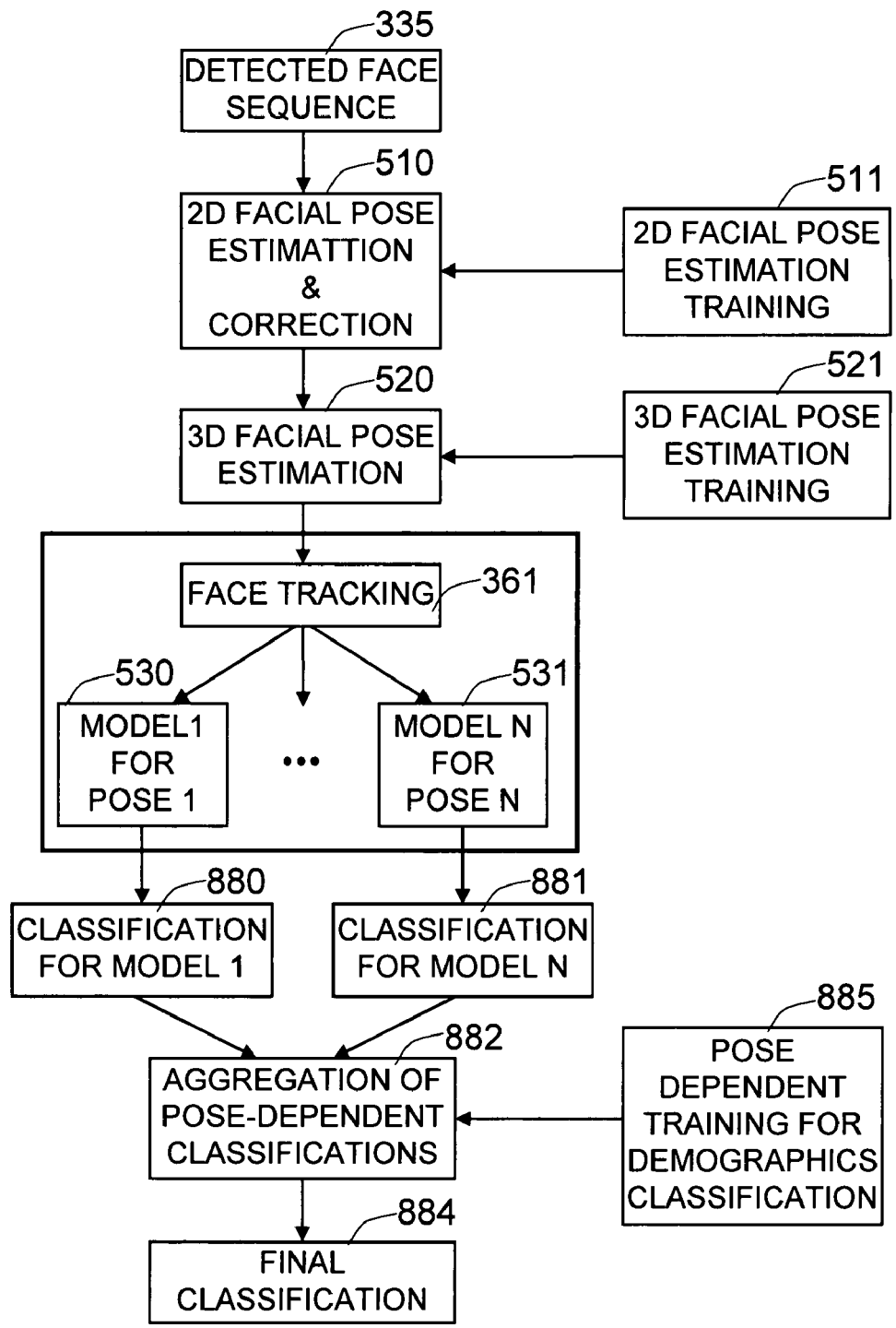
FIG. 1 is an overall scheme of the system in a preferred embodiment of the invention.

FIG. 1 is an overall scheme of the system in a preferred embodiment of the invention.

Overview

The proposed invention provides a face-based automatic demographics classification system that is robust to pose changes of the target faces and to accidental scene variables (such as noise, lighting, and occlusion). Given a sequence of detected faces 335 in a scene, the two-dimensional facial poses (position error, size, orientation) are estimated and corrected using a novel machine learning based method 510. As most of the face processing technologies suffer from the sensitivity of the system to the pose changes of the face, we estimate the three-dimensional pose 520 of the people, using a conceptually similar novel machine learning based approach. Then the face tracking 361 module keeps identities of the person using geometric and appearance cue of the person, where multiple appearance models, such as "model 1 for pose 1" 530 through "model N for pose N" 531, are built based on the poses of the faces. The separate processing of each pose makes the appearance model building more accurate so that the tracking performance becomes more accurate. Each separately built pose-dependent facial appearance model is fed to the demographics classifier, such as for the processes of the "classification for model 1" 880 through "classification for model N" 881, which is again trained by "pose-dependent training for demographics classification" 885 using only the faces having the corresponding pose. The classification scores from each pose-dependent classifier are aggregated 882 to generate the final classification 884 (such as gender, age, ethnicity, identity of the person, etc.).

Detailed Technical Descriptions

Two-dimensional Facial Pose Estimation

This is a method to normalize the two-dimensional pose of the face detected from face detection. The output faces from a typical face detection method are varied in terms of the two-dimensional pose: position, size, and in-plane orientation. The normalization of these geometric attributes greatly benefits the subsequent face processing. The two-dimensional pose of the face is corrected so that the facial features across the face are aligned. The normalization of the facial image also benefits the subsequent three-dimensional facial pose estimation, because the problem of three-dimensional pose estimation becomes more manageable when the locations of the facial features are aligned.

The perturbation of the two-dimensional facial pose (x position, y position, size, in-plane orientation) of the detected face from the standard pose (0, 0, standard size, 0 in-plane orientation) are estimated to normalize the face. After these quantities are estimated, the face image is shifted, resized, and rotated to have the standard pose.

The estimation of facial pose (position_x, position_y, scale, orientation) is carried out by employing a parallel array of multiple learning machine regressors. Each machine has an inherent pose parameter (x, y, s, o). This architecture of employing specialized learning machines contributes to highly improved accuracy, because it is well-known in the machine learning community that the learning machines do a more efficient estimation when they are given more limited (specialized) tasks.

Figure 2:
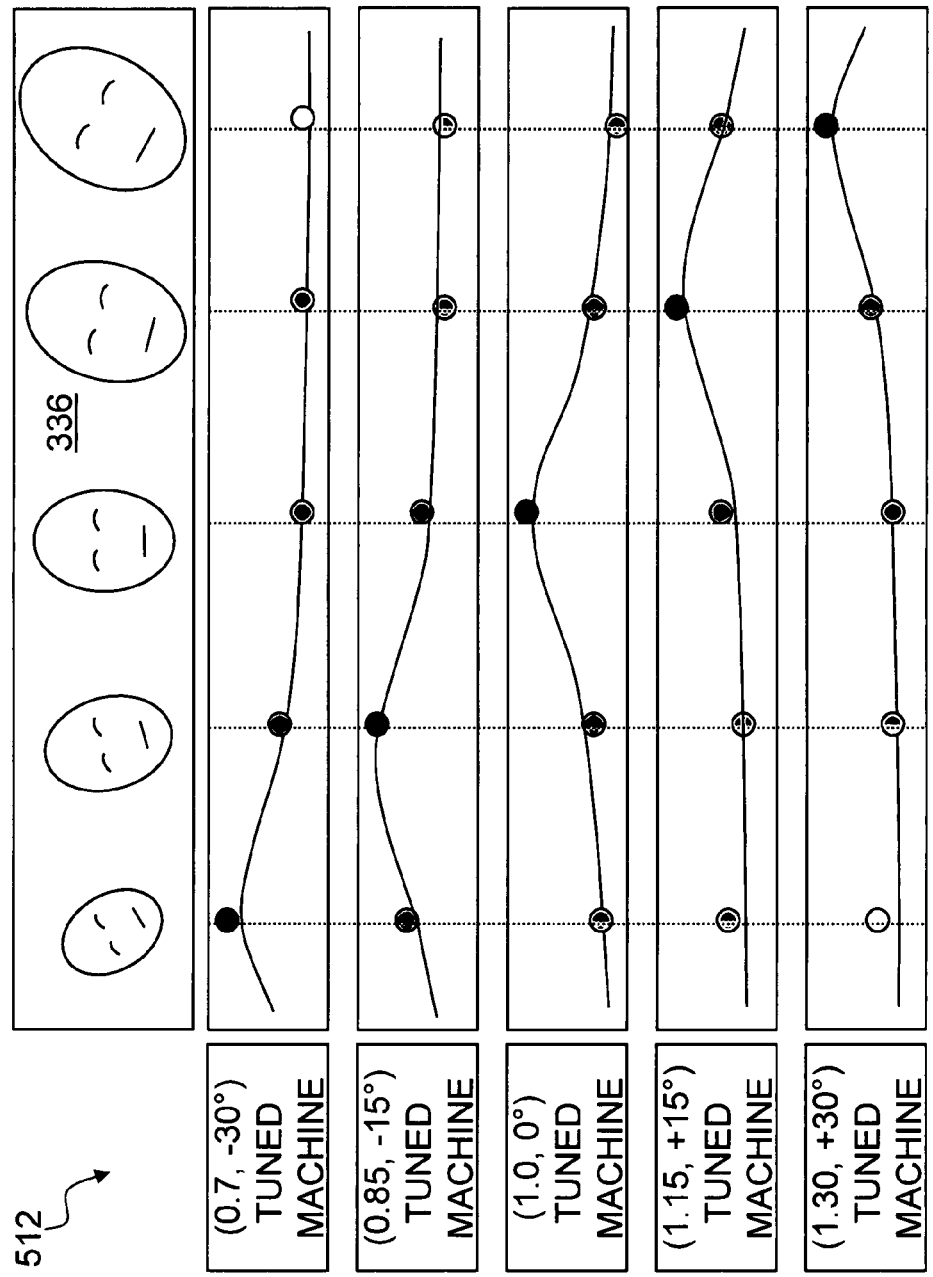
FIG. 2 shows a two-dimensional facial pose estimation training scheme in an exemplary embodiment of the present invention.

FIG. 2 shows a two-dimensional facial pose estimation training scheme 512 in an exemplary embodiment of the present invention.

The training faces are generated by applying the perturbation of the (x, y) position, size, and the orientation to the manually aligned faces. The ranges (or distribution) of the perturbation are determined to be the same as the ranges (or distribution) of actual geometric variation of the faces from the face detection. Given an input face, the machine having the inherent pose of (x, y, x, o) is trained to output the likelihood of the face having the inherent pose. If the input training face has the pose (xf, yf, sf, of), then the target output is the Gaussian likelihood: L=Exp(−(xf−x)/kx−(yf−y)/ky−(sf−s)/ks−(of−o)/ko). kx, ky, ks, ko are constants determined empirically. FIG. 2 illustrates the response profile that each machine is trained to learn. Each machine is learned to produce a peak for the faces having the corresponding two-dimensional pose, and to produce gradually lower values as the two-dimensional pose changes from the inherent two-dimensional pose of the machine. The figure is shown only for the two dimensions (s, o)=(scale, orientation) for the purpose of clear presentation.

Figure 3:
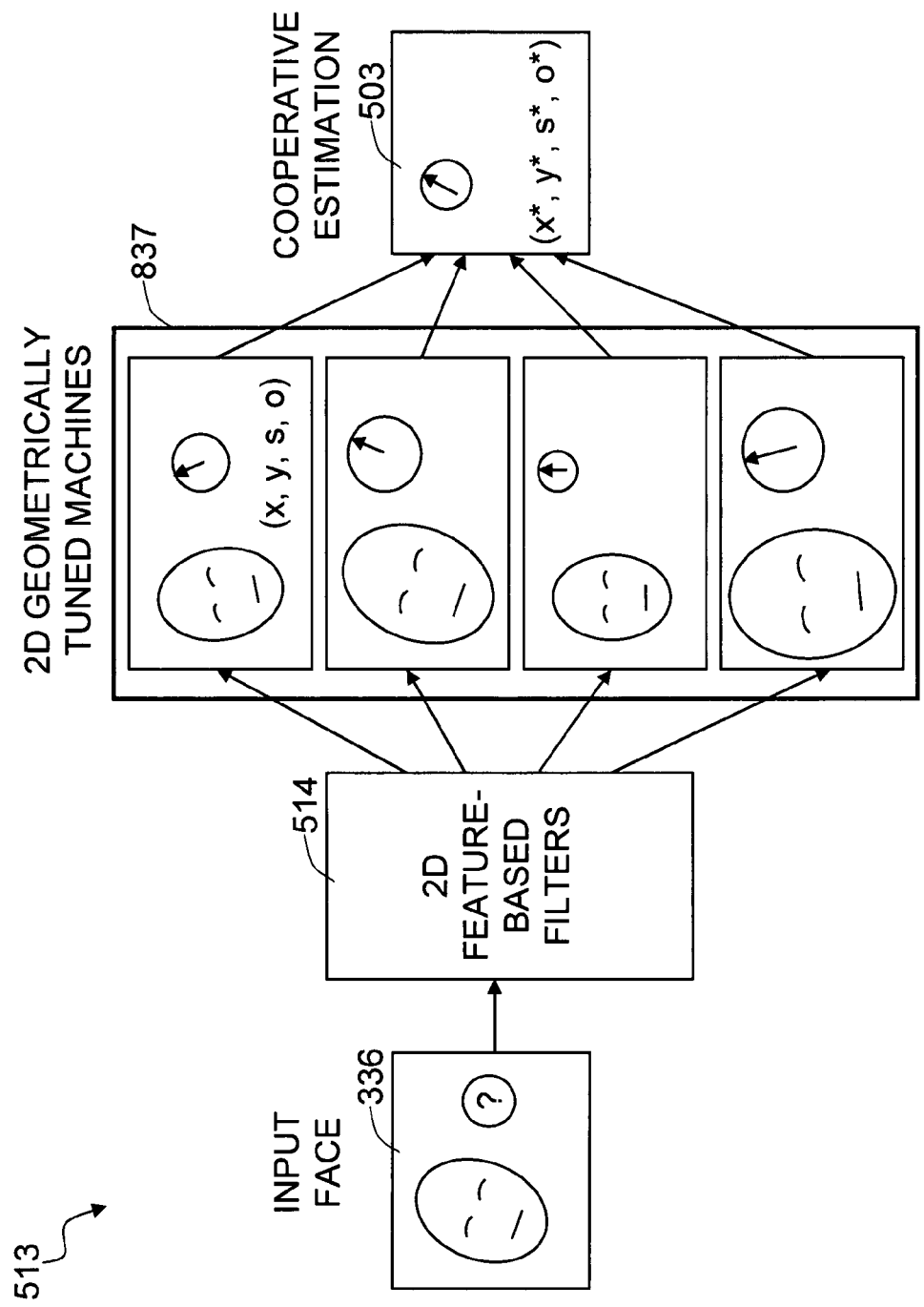
FIG. 3 shows a two-dimensional facial pose estimation scheme in an exemplary embodiment of the present invention.

FIG. 3 shows a two-dimensional facial pose estimation scheme 513 in an exemplary embodiment of the present invention.

After each network is trained, the input face 336 goes through the two-dimensional feature-based filters 514, and the pose (x*, y*, s*, o*) of the input face 336 is estimated by the cooperative estimation 503: the sum of the inherent parameters (x, y, s, o) of all the learning machines, each weighted by the likelihood. L_I, estimated by each two-dimensional pose tuned machine 837:

$$(x^*, y^*, s^*, o^*) = \text{SUM}\{i=1, \ldots, N\} L\_i^*(x\_i, y\_i, s\_i, o\_i)$$

Figure 4:
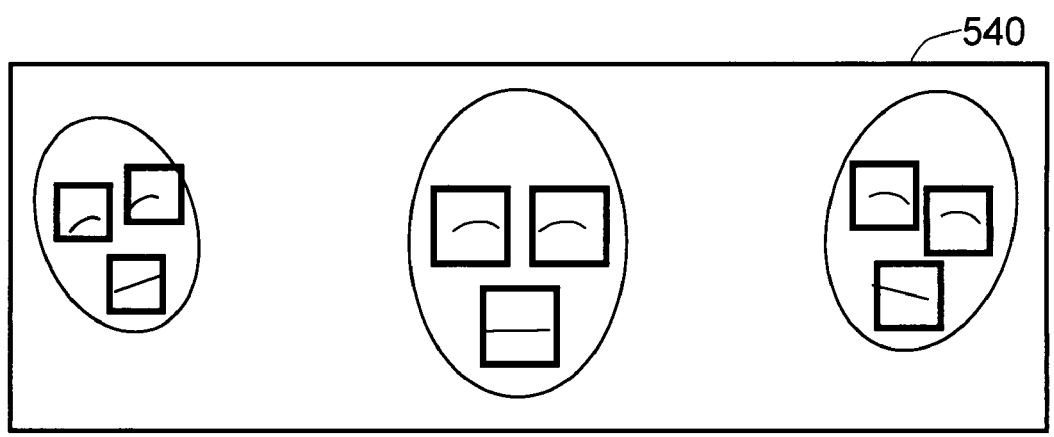
FIG. 4 shows the facial-feature window filter in an exemplary embodiment of the present invention.

FIG. 4 shows the facial-feature window filter 540 in an exemplary embodiment of the present invention.

In one of the exemplary embodiments, the training and testing is carried out on the filtered representation, instead of the whole facial image pixel values. It is the projection of the whole facial image by a set of windows, whose sizes and locations match the locations and the sizes of the corresponding facial features. Each learning machine tuned to a specific pose has a corresponding set of three windows, two for picking up both eye regions and one for the mouth region, whose positions and sizes are based on the feature positions and sizes of the corresponding face model. FIG. 4 shows some of such filters.

In one of the exemplary embodiments, the training and testing is carried out on the filtered representation, instead of raw image pixel values. It is the transformation by a set of filters, constructed to collect edge responses of the boundary gradient signature of the facial features. One set of filters consists of ten circles or circular arc shaped filters that are matched to the shapes of each facial feature (left/right eyebrows, left/right eyes, left/right irises, nose ridge, nose tip, mouth, and the face boundary). 100 of such sets (total of 1000 filters) are generated, from 100 randomly sampled "faces" within the possible ranges of two-dimensional geometric variation. The range of the model pose for generating the filter corresponds to the individual inherent two-dimensional pose of the specific machine, thereby providing a more specialized estimation. Circular arcs on an ellipsoid, whose size and orientation match the model parameter, model the shapes of the filters. The step serves to extract high-spatial frequency structure of the facial features, while suppressing the irrelevant low-spatial frequency structure mostly generated from lighting variation.

In one of the exemplary embodiments, each set (x, y, s, o) of geometric parameters is chosen by randomly sampling from the ranges of possible values. The range is typically determined by the distribution of the parameters from a large number of faces from face detection.

In one of the exemplary embodiments, the learning machine regressors are neural networks.

Three-Dimensional Facial Pose Estimation

This is a method to determine the three-dimensional pose (out-of-plane rotation) of the face detected from the face detection.

The estimation of the three-dimensional facial pose (yw, pt)=(yaw, pitch) is carried out by employing a parallel array of multiple learning machine regressors. Each machine network has an inherent pose parameter (yw, pt). Given an input face, the network is trained to estimate the likelihood of the face having the inherent pose. If the face has the pose (ywF, ptF), then the target output is the Gaussian likelihood: L=Exp(−(ywF−yw)/ky−(ptF−pt)/kp). ky, kp are constants that are determined empirically. This architecture of employing specialized learning machines contributes to highly improved accuracy, because it is well-known in the machine learning community that the machines do more efficient estimation when they are given more specific tasks.

Figure 5:
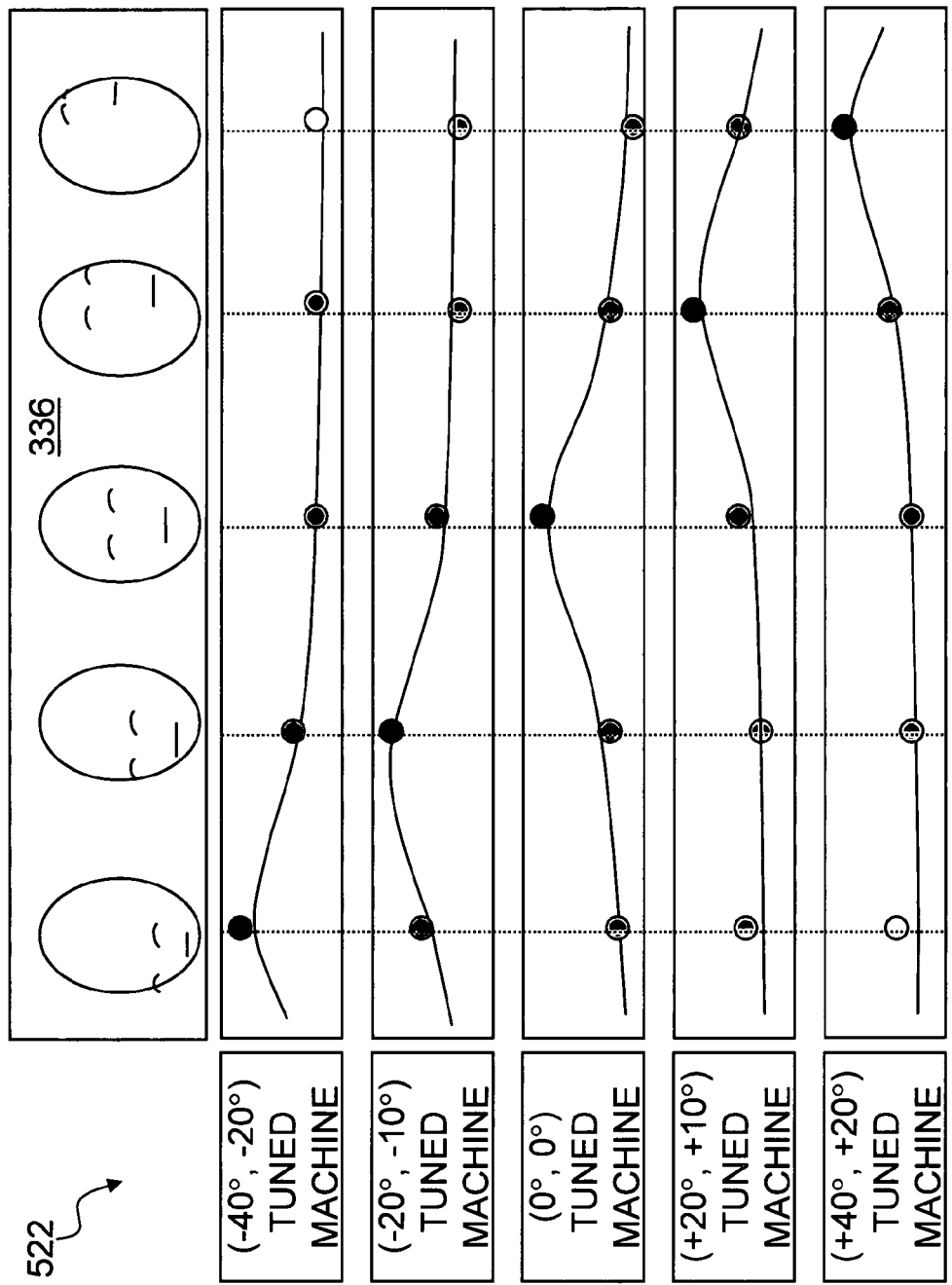
FIG. 5 shows a three-dimensional facial pose estimation training scheme in an exemplary embodiment of the present invention.

FIG. 5 shows a three-dimensional facial pose estimation training scheme 522 in an exemplary embodiment of the present invention.

The facial images used for training are typically normalized from facial pose estimation and correction 510, so that the system estimates three-dimensional pose more efficiently. FIG. 5 illustrates the response profile that each machine is trained to learn. Each machine is trained to produce a peak for the faces having the corresponding (yw, pt), and to produce gradually lower values as the (yw, pt) changes from the inherent (yw, pt) of the machine.

Figure 6:
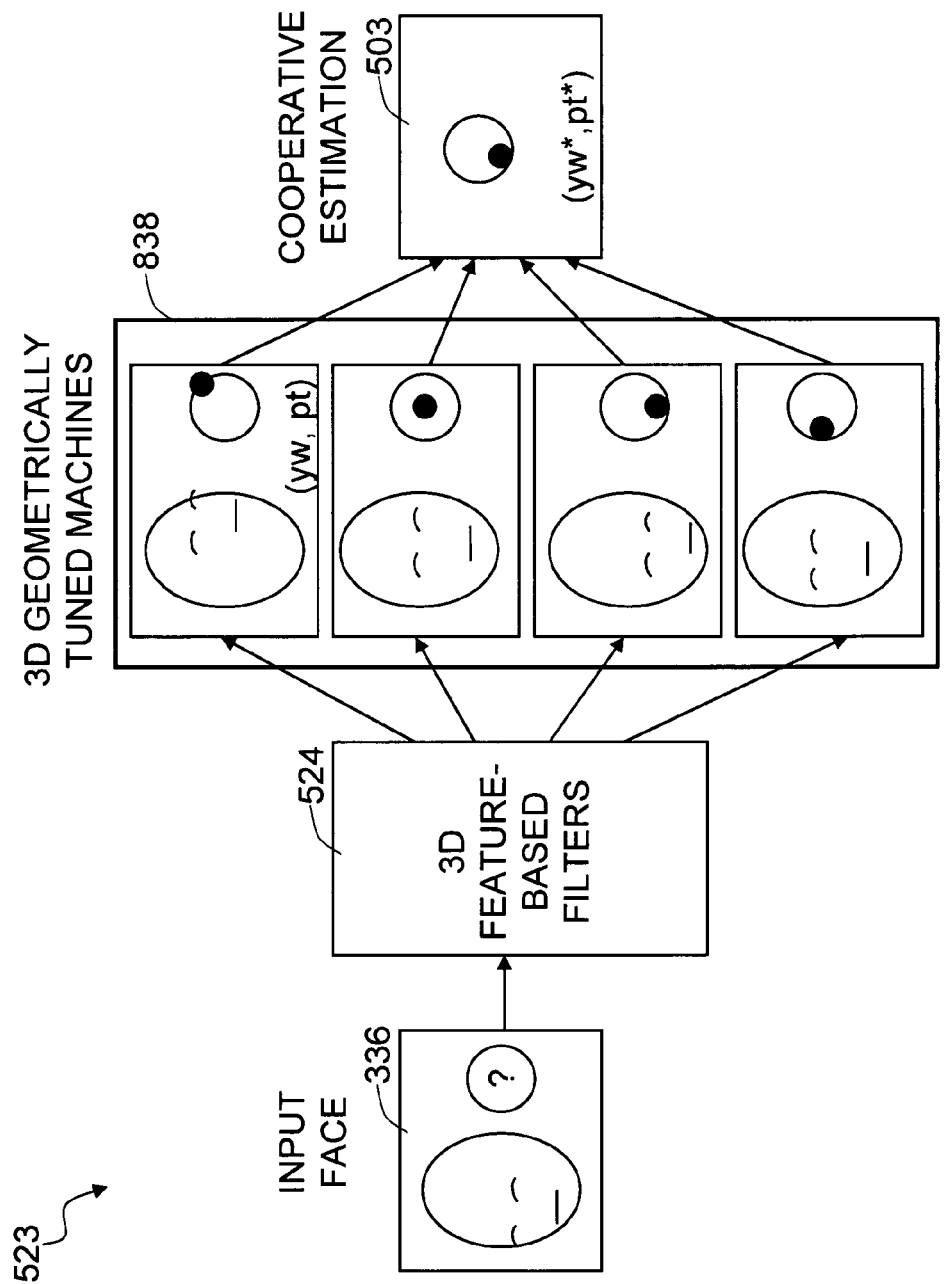
FIG. 6 shows a three-dimensional facial pose estimation scheme in an exemplary embodiment of the present invention.

FIG. 6 shows a three-dimensional facial pose estimation scheme 523 in an exemplary embodiment of the present invention.

After each network is trained, the input face 336 goes through the three-dimensional feature-based filters 524, and the pose (yw*, pt*) of the input face 336 is estimated by the cooperative estimation 503: the sum of the inherent parameters (yw*, pt*) of all the learning machines, each weighted by the estimated likelihood L_i of the given i-th pose, estimated by each three-dimensional pose tuned machine 838:

$$(yw^*, pt^*) = \text{SUM}\{i=1, \ldots, N\} L\_i^*(yw\_i, pt\_i)$$

In one of the exemplary embodiments, the training and testing is carried out on the filtered representation, instead of raw image pixel values. It is the transformation by a set of filters constructed to collect boundary edge responses of the gradient signature of facial features. One set of filter consists of ten circle or circular arc shaped filters that are matched to the shapes of each facial feature (left/right eyebrows, left/right eyes, left/right irises, nose ridge, nose tip, mouth, and the face boundary). 100 of such sets (total of 1000 filters) are generated, from 100 randomly sampled "faces" within the possible ranges of (yw, pt) variation. The range of the model pose for generating the filter corresponds to the individual inherent three-dimensional pose of the specific machine, thereby providing a more specialized estimation. The method serves to extract the high-spatial frequency structure of the facial features, while suppressing the irrelevant low-spatial frequency structure mostly generated from lighting variation.

Figure 7:
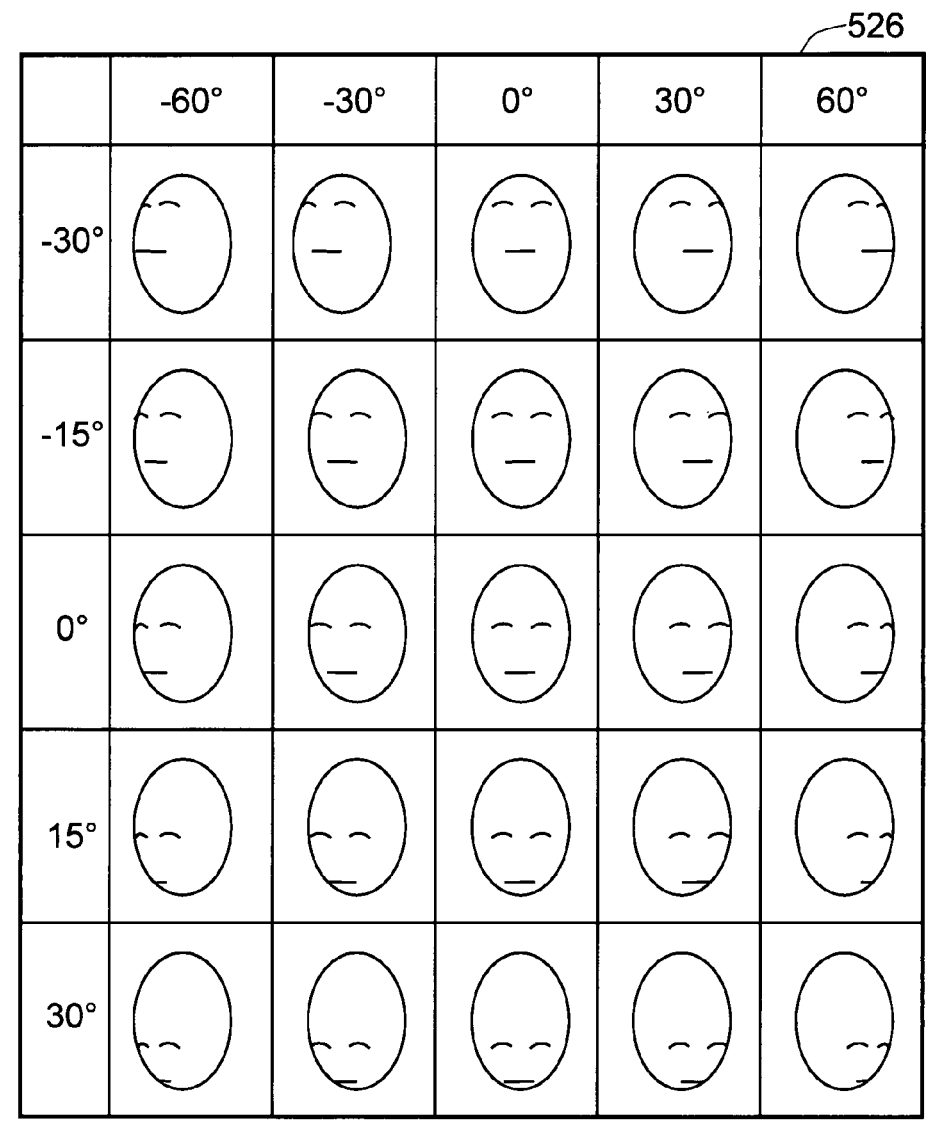

FIG. 7 shows an exemplary sampling of (yw, pt) ranges for three-dimensional pose estimation 526 in an exemplary embodiment of the present invention.

In one of the exemplary embodiments, each set (yw, pt) of geometric parameters is chosen by sampling from the ranges of possible values. The range is typically determined by the target pose ranges to be estimated. In the exemplary embodiment shown in FIG. 7, the table shows one such sampled pose bin, where each pose dimension is split into 5 pose bins.

In one of the exemplary embodiments, the learning machine regressors are neural networks.

Figure 8:
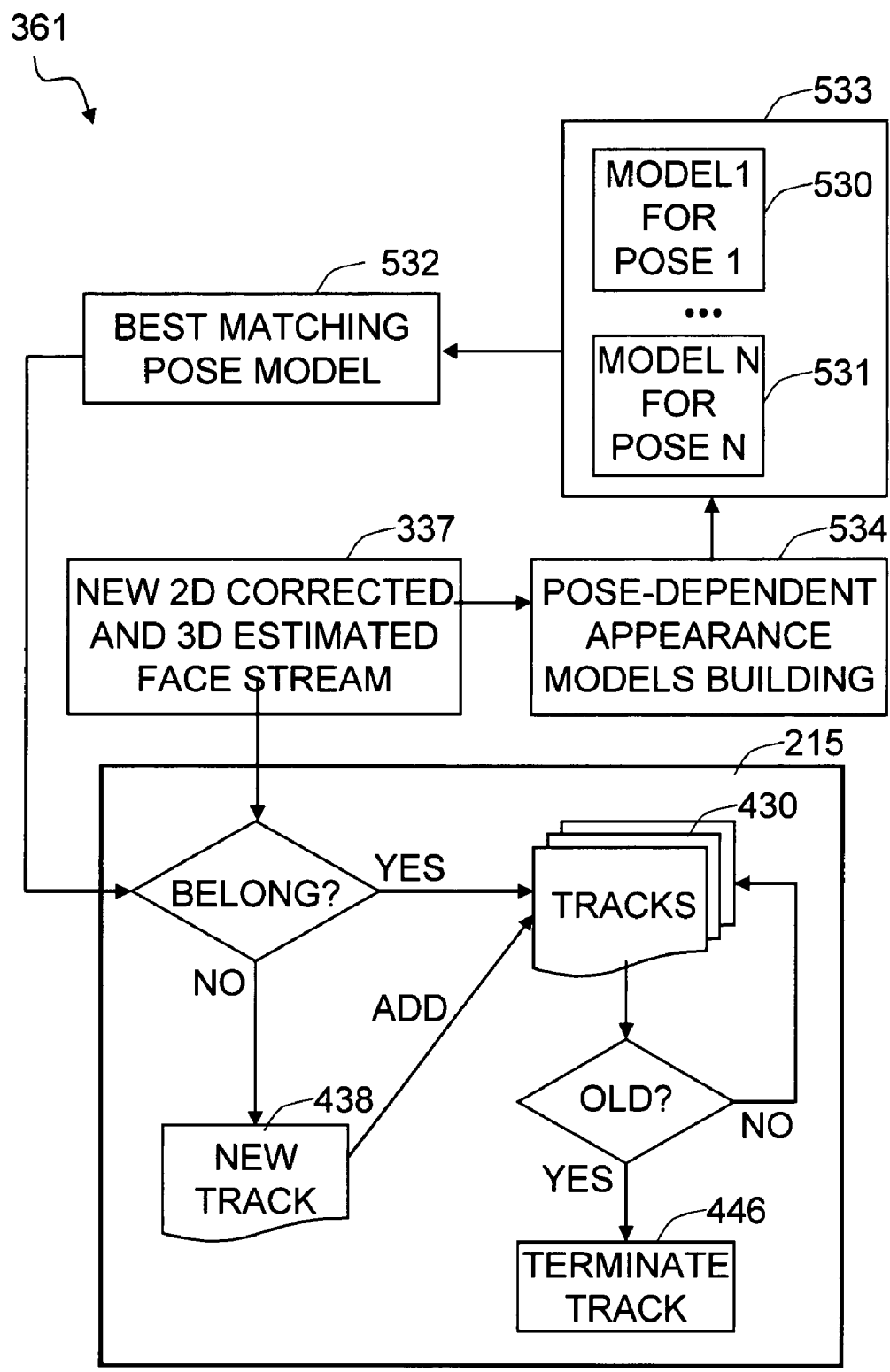
FIG. 8 shows a face track management module in an exemplary embodiment of the present invention.

FIG. 8 shows a face tracking 361 in an exemplary embodiment of the present invention.

Face Tracking and Appearance Model Building

The face tracking 361 is carried out on the two-dimensional corrected and three-dimensional estimated face sequence 337, where the three-dimensional pose is used to send the faces to separate pose-dependent appearance models. The face tracking serves two purposes: to keep the identity of the person and to construct the pose-dependent appearance models 533 for subsequent demographics classification. The face tracking 361 step consists of the face track management module 215 and the pose-dependent appearance models building 534 module.

The face track management module 215 generates a new track 438 when a new person appears in the scene, assigns detected faces to existing tracks 430 to keep identities of people in the scene, and terminates a track 446 when a person is out of the scene. When new faces are detected in the current video frame, the face track management module 215 constructs a table of the new faces and the existing tracks. Then it computes the geometric match and the appearance match score of each (face, track) pair that measures the likelihood of the given face belonging to the given track. The geometric match score is based on the difference in position, size, and the time between the new face and the last face in the track. The appearance match score measures the difference between a face appearance model built by the appearance model building module, and the new face appearance. Each track can have multiple appearance models, when the faces in the track show a wide range of three-dimensional poses. In that case, the appearance score from the best matching pose model 532 (that is, having the highest score) out of the pose-dependent appearance models 533, is registered as the appearance score of the track. If the total score is below a predetermined threshold, the pair is excluded from the table. The pair having the highest score gets the assignment: face→track. This procedure is repeated until all the faces are assigned to matching tracks. However, if there is a new person in the scene, the face is not supposed to have a match with one of existing tracks. In that case, the threshold should have excluded the face, and the face should remain in the queue. The face then generates a new track 438, and the track is added to the list of tracks 430.

For every frame, if a certain track does not have a new face for more than a certain time period, the face track management module 215 terminates the track 446.

The pose-dependent appearance model building 534 module builds possibly multiple pose-dependent appearance models 533 of the faces that belong to the track. The input face is already corrected by the two-dimensional facial pose estimation and correction 510, and the three-dimensional pose has been estimated by the three-dimensional facial pose estimation 520. The three-dimensional pose of the face assigns the given face to one of the pose-dependent appearance models. Each model has different facial pose, such as frontal, left profile, or right profile. Faces in each model construct a separate appearance model (e.g., "model 1 for pose 1" 530 through, "model N for pose N" 531) by incrementally adding the two-dimensional pose-corrected faces. Building multiple pose-dependent appearance models 533 according to the three-dimensional pose makes it possible to build more accurate appearance models, thereby achieving more robust tracking and accurate demographics classification.

Figure 9:
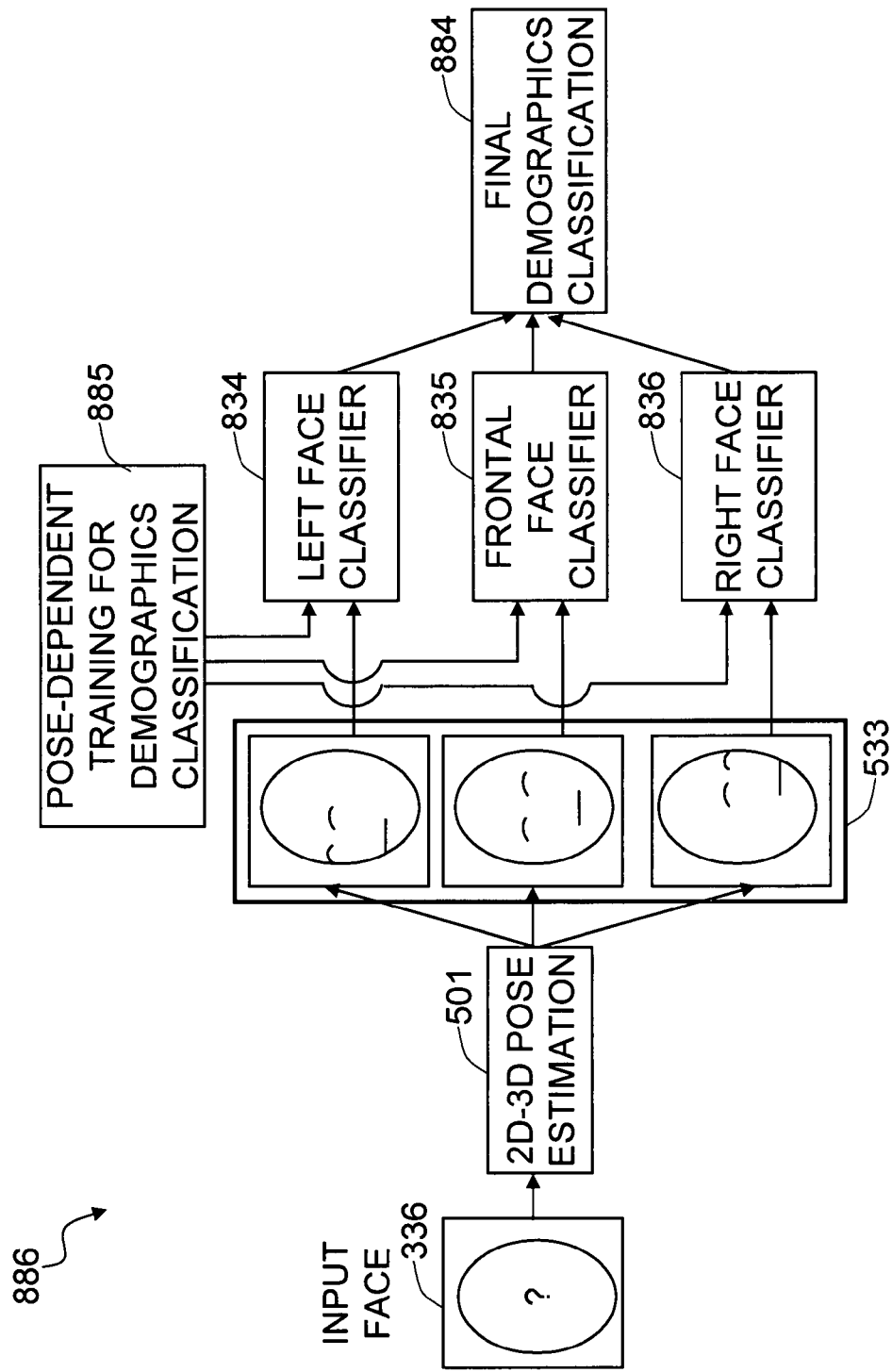
FIG. 9 shows a three-dimensional facial pose based demographics classification scheme in an exemplary embodiment of the present invention.

FIG. 9 shows a three-dimensional pose-dependent demographics classification scheme 886 in an exemplary embodiment of the present invention.

Demographics Classification on Multiple Appearance Models

Once the track is completed, the demographics classification is carried out on the pose-dependent appearance models 533 constructed by the pose-dependent appearance model building 534 module. The pose-dependent training for demographics classification 885 generates multiple classifiers for pose-dependent classifications, where each classification machine is trained using the faces having the corresponding pose. In one of the exemplary embodiments, the pose-dependent training for demographics classification 885 generates three classifiers: the left face classifier 834, the frontal face classifier 835, and the right face classifier 836.

The sum of demographics scores from all the pose-dependent classifications, weighted by the confidence levels of that particular appearance models, determines the final classification 884 of the face. In one of the exemplary embodiments, the confidence level of a specific model is the proportion of the number of faces that were used to build the model, to the total number of faces in the track. This scheme achieves four important improvements. First, by executing demographics classification (which typically consumes significant computing resources) only once per track, the whole system resource is utilized more efficiently thereby improving the speed of execution. Second, by constructing pose-dependent appearance models 533 and matching against the input face having the same pose range, the tracking accuracy improves. The tracking accuracy translates into classification accuracy, because if the track has faces belonging to more than one person, the classification accuracy degrades. Third, the demographics classification accuracy improves because the appearance models built are less prone to accidental image variables such as noise, lighting variations, occlusions, etc. Fourth, by performing three-dimensional pose-dependent classification, the demographics classification achieves better accuracy. The training should also be a pose-dependent demographics classification training 885.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for automatically performing robust and efficient demographics classification based on a sequence of facial images of people, using a pose-independent facial image representation, comprising the following steps of:
   a) capturing a plurality of input images of the people by a plurality of means for capturing images,
   b) detecting faces in a plurality of images captured from said means for capturing images c) estimating a two-dimensional facial pose and three-dimensional facial pose of the detected face by employing a parallel array of multiple learning machine regressors, d) tracking the faces to keep the identity of the person, e) constructing multiple pose-dependent appearance models of the faces that belong to a given track, and f) performing demographics classification based on a pose-independent face representation, wherein the method further comprises multiple pose-dependent facial appearance models built for tracking and classification, based on an estimated pose of the face, and whereby demographic information can comprise age, gender, and ethnicity information.

2. The method according to claim 1, wherein the method further comprises a step of detecting faces in a plurality of images captured from said means for capturing images, using a machine learning based face detection method.

3. The method according to claim 1, wherein the method further comprises a step of estimating the two-dimensional facial pose of the detected face by employing a parallel array of multiple learning machine regressors, wherein each machine has an inherent pose parameter, and is trained to output the likelihood of the input face having the inherent pose.

4. The method according to claim 3, wherein the method further comprises a step of correcting the two-dimensional pose of the face detected from face detection, by using the estimated two-dimensional facial pose.

5. The method according to claim 3, wherein the method further comprises a step of generating the training face images by applying a perturbation of the (x, y) position, size, and the orientation to the manually aligned faces, wherein the distribution of the perturbation is chosen to be the same as the distribution of actual geometric variation of the faces from the face detection step.

6. The method according to claim 3, wherein the method further comprises a step of extracting relevant features having a certain facial pose, for the training and testing, by collecting a sub-regions of the whole facial image, where the regions are defined by a set of windows, whose locations and sizes match the locations and the sizes of the corresponding facial features having a described global facial pose.

7. The method according to claim 3, wherein the method further comprises a step of extracting relevant features for estimating the facial pose, for the training and testing, by applying the filtering by a set of filters constructed to collect edge responses of a boundary gradient signature of the facial features, wherein the range of the model pose for generating the filter corresponds to an individual inherent two-dimensional pose of a specific machine, thereby providing a more specialized estimation.

8. The method according to claim 1, wherein the method further comprises a step of estimating the three-dimensional facial pose of the detected face by employing a parallel array of multiple learning machine regressors, wherein each machine has an inherent three-dimensional pose parameter, and is trained to output the likelihood of the input face having an inherent pose.

9. The method according to claim 8, wherein the method further comprises a step of generating the training face images by applying a two-dimensional facial pose correction to the faces having varied three-dimensional pose, detected from the face detection step.

10. The method according to claim 8, wherein the method further comprises a step of extracting relevant features for estimating the facial pose, for the training and testing, by applying a filtering by a set of filters constructed to collect a boundary gradient signature of the facial features, wherein the range of the model pose for generating the filter corresponds to an individual inherent three-dimensional pose of the specific machine, thereby providing a more specialized estimation.

11. The method according to claim 1, wherein the method further comprises a step of tracking the faces to keep the identity of the person, by using geometric and appearance match scores.

12. The method according to claim 11, wherein the method further comprises the following steps of:

a) generating a track when a new person appears in the scene, b) assigning detected faces to existing tracks to keep identities of people in the scene, and c) terminating a track when a person is out of the scene.

13. The method according to claim 11, wherein the method further comprises a step of finding a highest score match between the track history and the new input face using both geometric and appearance match scores.

14. The method according to claim 1, wherein the method further comprises a step of constructing multiple pose-dependent appearance models of the faces that belong to a given track, based on the estimated three-dimensional pose of the face.

15. The method according to claim 14, wherein the method further comprises a step of sending each new face in the track to one of the pose-dependent appearance models based on the estimated pose, and incrementally add the pixel values to the corresponding appearance model after applying histogram equalization and linear lighting adjustment to reduce the effect of lighting variation.

16. The method according to claim 1, wherein the method further comprises a step of performing demographics classification based on a set of pose-dependent synthetic facial appearance models, which is pose-independent as a whole.

17. The method according to claim 16, wherein the method further comprises a step of performing the classifications across different demographics categories and across different poses, wherein the classification is performed on the pose-dependent synthetic appearance models built during the tracking, instead of being performed on individual face image instances.

18. The method according to claim 16, wherein the method further comprises a step of aggregating the demographics scores from all the pose-dependent demographics classifications, wherein each score is weighted by the confidence level of that particular appearance models.

19. The method according to claim 16, wherein the method further comprises a step of training multiple demographics learning machines, wherein each machine is trained to estimate the likelihood of the given pose-dependent appearance model possessing a certain demographics category.

20. An apparatus for automatically performing robust and efficient demographics classification based on a sequence of the facial images of people, using a pose-independent facial image representation, comprising:

a) means for capturing a plurality of input images of the people by a plurality of means for capturing images, b) means for detecting faces in a plurality of images captured from said means for capturing images
c) means for estimating a two-dimensional facial pose and three-dimensional facial pose of the detected face by employing a parallel array of multiple learning machine regressors,
d) means for tracking the faces to keep the identity of the person,
e) means for constructing multiple pose-dependent appearance models of the faces that belong to a given track, and
f) means for performing demographics classification based on a pose-independent face representation,
wherein the apparatus further comprises means for building multiple pose-dependent facial appearance models built for tracking and classification, based on an estimated pose of the face, and
whereby demographic information can comprise age, gender, and ethnicity information.

21. The apparatus according to claim 20, wherein the apparatus further comprises means for detecting faces in a plurality of images captured from said means for capturing images, using a machine learning based face detection method.

22. The apparatus according to claim 20, wherein the apparatus further comprises means for estimating the two-dimensional facial pose of the detected face by employing a parallel array of multiple learning machine regressors,
wherein each machine has an inherent pose parameter, and is trained to output the likelihood of the input face having the inherent pose.

23. The apparatus according to claim 22, wherein the apparatus further comprises means for correcting the two-dimensional pose of the face detected from face detection, by using the estimated two-dimensional facial pose.

24. The apparatus according to claim 22, wherein the apparatus further comprises means for generating the training face images by applying a perturbation of the (x, y) position, size, and the orientation to the manually aligned faces,
wherein the distribution of the perturbation is chosen to be the same as the distribution of actual geometric variation of the faces from the face detection step.

25. The apparatus according to claim 22, wherein the apparatus further comprises means for extracting relevant features having a certain facial pose, for the training and testing, by collecting a sub-regions of the whole facial image,
where the regions are defined by a set of windows, whose locations and sizes match the locations and the sizes of the corresponding facial features having a described global facial pose.

26. The apparatus according to claim 22, wherein the apparatus further comprises means for extracting relevant features for estimating the facial pose, for the training and testing, by applying the filtering by a set of filters constructed to collect edge responses of a boundary gradient signature of the facial features,
wherein the range of the model pose for generating the filter corresponds to an individual inherent two-dimensional pose of a specific machine, thereby providing a more specialized estimation.

27. The apparatus according to claim 20, wherein the apparatus further comprises means for estimating the three-dimensional facial pose of the detected face by employing a parallel array of multiple learning machine regressors,
wherein each machine has an inherent three-dimensional pose parameter, and is trained to output the likelihood of the input face having an inherent pose.

28. The apparatus according to claim 27, wherein the apparatus further comprises means for generating the training face images by applying a two-dimensional facial pose correction to the faces having varied three-dimensional pose, detected from the face detection step.

29. The apparatus according to claim 27, wherein the apparatus further comprises means for extracting relevant features for estimating the facial pose, for the training and testing, by applying a filtering by a set of filters constructed to collect a boundary gradient signature of the facial features,
wherein the range of the model pose for generating the filter corresponds to an individual inherent three-dimensional pose of the specific machine, thereby providing a more specialized estimation.

30. The apparatus according to claim 20, wherein the apparatus further comprises means for tracking the faces to keep the identity of the person, by using geometric and appearance match scores.

31. The apparatus according to claim 20, wherein the apparatus further comprises:
a) means for generating a track when a new person appears in the scene,
b) means for assigning detected faces to existing tracks to keep identities of people in the scene, and
c) means for terminating a track when a person is out of the scene.

32. The apparatus according to claim 30, wherein the apparatus further comprises means for finding a highest score match between the track history and the new input face using both geometric and appearance match scores.

33. The apparatus according to claim 20, wherein the apparatus further comprises means for constructing multiple pose-dependent appearance models of the faces that belong to a given track, based on the estimated three-dimensional pose of the face.

34. The apparatus according to claim 33, wherein the apparatus further comprises means for sending each new face in the track to one of the pose-dependent appearance models based on the estimated pose, and incrementally adding the pixel values to the corresponding appearance model after applying histogram equalization and linear lighting adjustment to reduce the effect of lighting variation.

35. The apparatus according to claim 20, wherein the apparatus further comprises means for performing demographics classification based on a set of pose-dependent synthetic facial appearance models, which is pose-independent as a whole.

36. The apparatus according to claim 35, wherein the apparatus further comprises means for performing the classifications across different demographics categories and across different poses,
wherein the classification is performed on the pose-dependent synthetic appearance models built during the tracking, instead of being performed on individual face image instances.

37. The apparatus according to claim 35, wherein the apparatus further comprises means for aggregating the demographics scores from all the pose-dependent demographics classifications,
wherein each score is weighted by the confidence level of that particular appearance models.

38. The apparatus according to claim 35, wherein the apparatus further comprises means for training multiple demographics learning machines,
wherein each machine is trained to estimate the likelihood of the given pose-dependent appearance model possessing a certain demographics category.

* * * * *